United States Patent [19]
Tedesco

[11] Patent Number: 5,418,631
[45] Date of Patent: May 23, 1995

[54] EDGE-LIT HOLOGRAPHIC DIFFUSERS FOR FLAT-PANEL DISPLAYS

[75] Inventor: James M. Tedesco, Livonia, Mich.

[73] Assignee: Kaiser Optical Systems, Inc., Ann Arbor, Mich.

[21] Appl. No.: 62,824

[22] Filed: May 14, 1993

[51] Int. Cl.$^6$ .................. G02B 5/32; G02B 5/02; G02F 1/1335
[52] U.S. Cl. ..................... 359/15; 359/28; 359/34; 359/69; 359/105; 359/599
[58] Field of Search ............ 359/13, 14, 15, 34, 359/37, 105, 599, 28, 69

[56] References Cited

U.S. PATENT DOCUMENTS

| | | | |
|---|---|---|---|
| 4,372,639 | 2/1983 | Johnson | 359/13 |
| 4,586,781 | 5/1986 | Gunther et al. | 359/34 |
| 4,735,473 | 4/1988 | Migozzi et al. | 359/34 |
| 4,737,001 | 4/1988 | Moss | 359/34 |
| 4,900,133 | 2/1990 | Berman | 359/13 |
| 4,984,872 | 1/1991 | Vick | 359/15 |
| 5,046,793 | 9/1991 | Hockley et al. | 359/599 |

FOREIGN PATENT DOCUMENTS 57-142608  9/1982  Japan .................. 359/34

OTHER PUBLICATIONS

Lukosz et al, "Holograms Recorded and Read-Out with the Evanescent Field of Guided Waves," 1978, pp. WD5-1 to WD5-4.
Pennington et al, "Fast Wave Optical Guide Couplers Using Holographic Elements," *IBM Technical Disclosure Bulletin,* vol. 13, No. 8, Jan. 1971, pp. 2280 to 2281.
Tedesco et al, "Holographic Diffusers for LCD Backlights and Projection Screens," *SID 93 Digest,* May 16, 1994, pp. 29 to 32.

*Primary Examiner*—Martin Lerner
*Attorney, Agent, or Firm*—Gifford, Krass

[57] ABSTRACT

Methods of recording and using holographic diffusers are disclosed for use with edge-lit backlight assemblies for transmissive flat-panel displays such as LCDs. When the holographic diffuser is supported against a surface of a backlight-emitting substrate it is operative to scatter the light in the direction of the display panel largely independent of angle of incidence. The recording methods may be used to produce both transmissive- and reflective-type diffusers, which may be employed simultaneously. In one embodiment a transmissive diffuser is used with a reflector and a cholesteric liquid crystal (CLC) polarizer. In this configuration, scatter lobes exhibiting the correct circular polarization are passed by CLC polarizer, whereas radiation of the opposite handedness is redirected toward the reflector, which converts the handedness into the form passable by the CLC polarizer. A quarter-wave plate, added between the CLC polarizer and the display, is operative to transform the circularly polarized scattered radiation into linearly polarized light, obviating the requirement for an additional rear polarizer on the LCD display. An application incorporating a secondary information source, such as an intensified night-vision image, is also described.

16 Claims, 3 Drawing Sheets

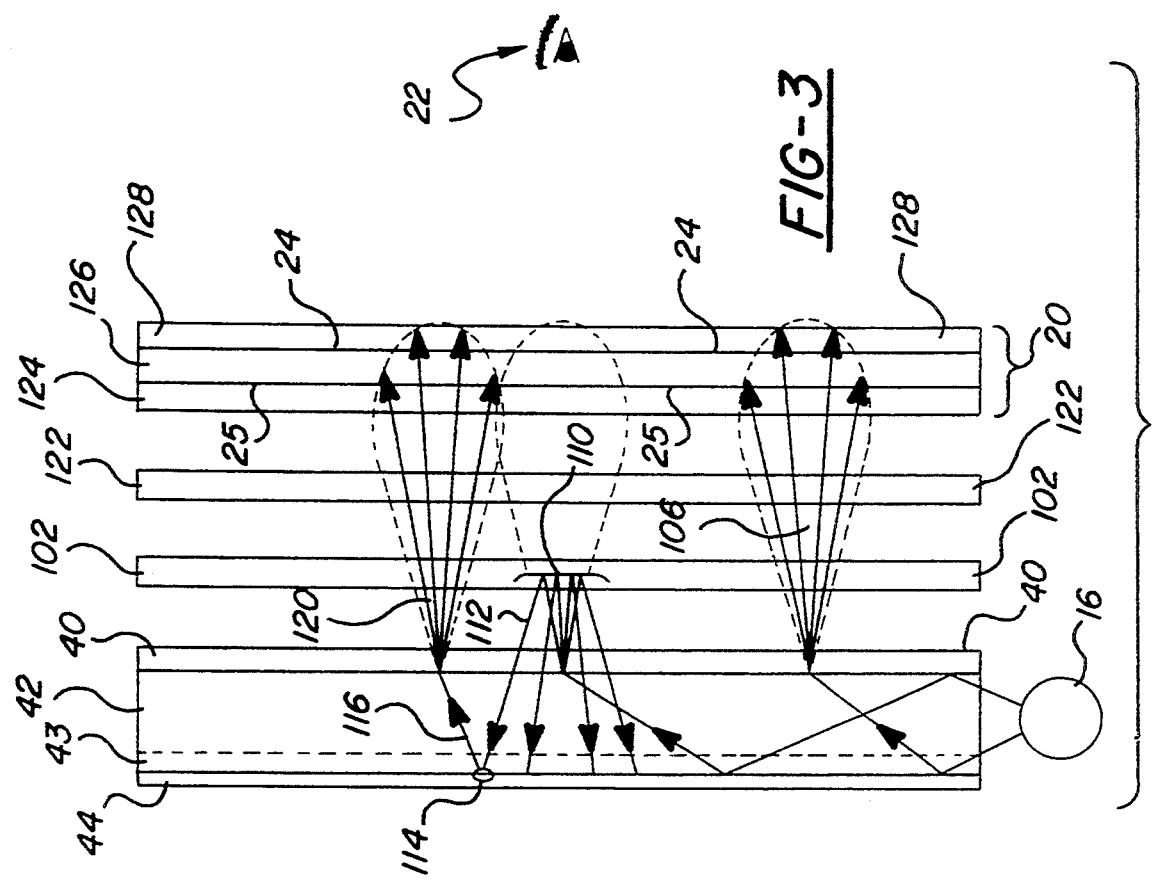
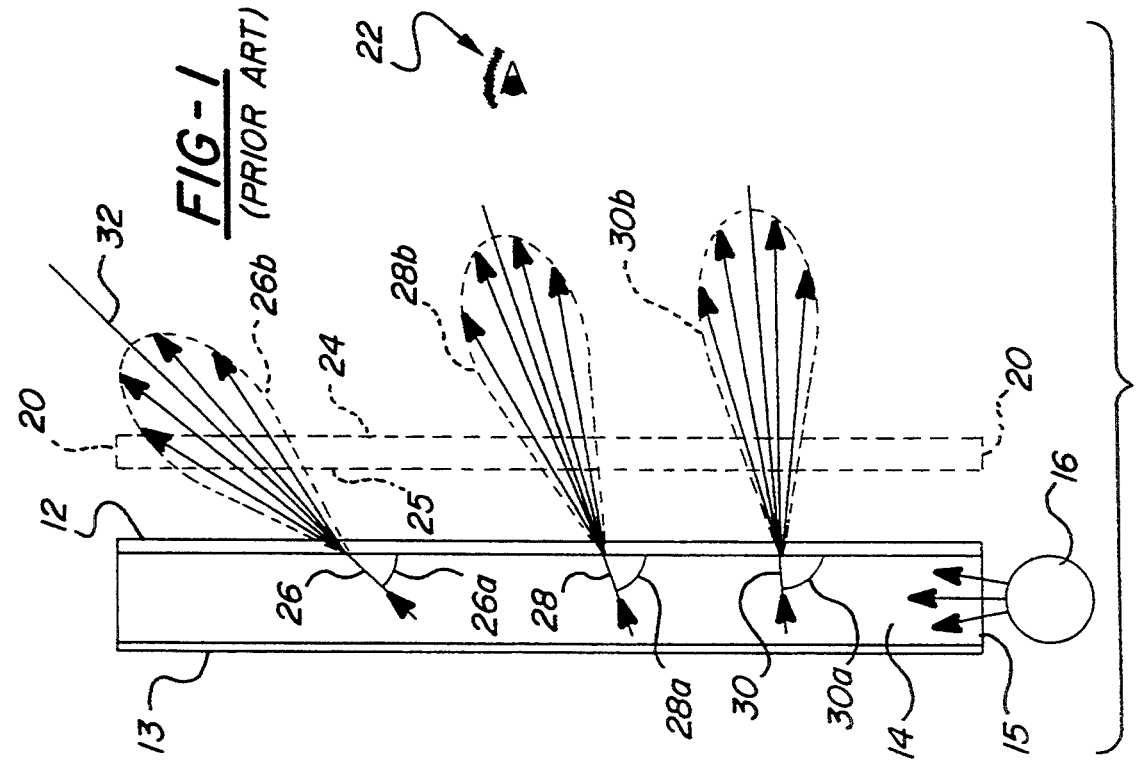

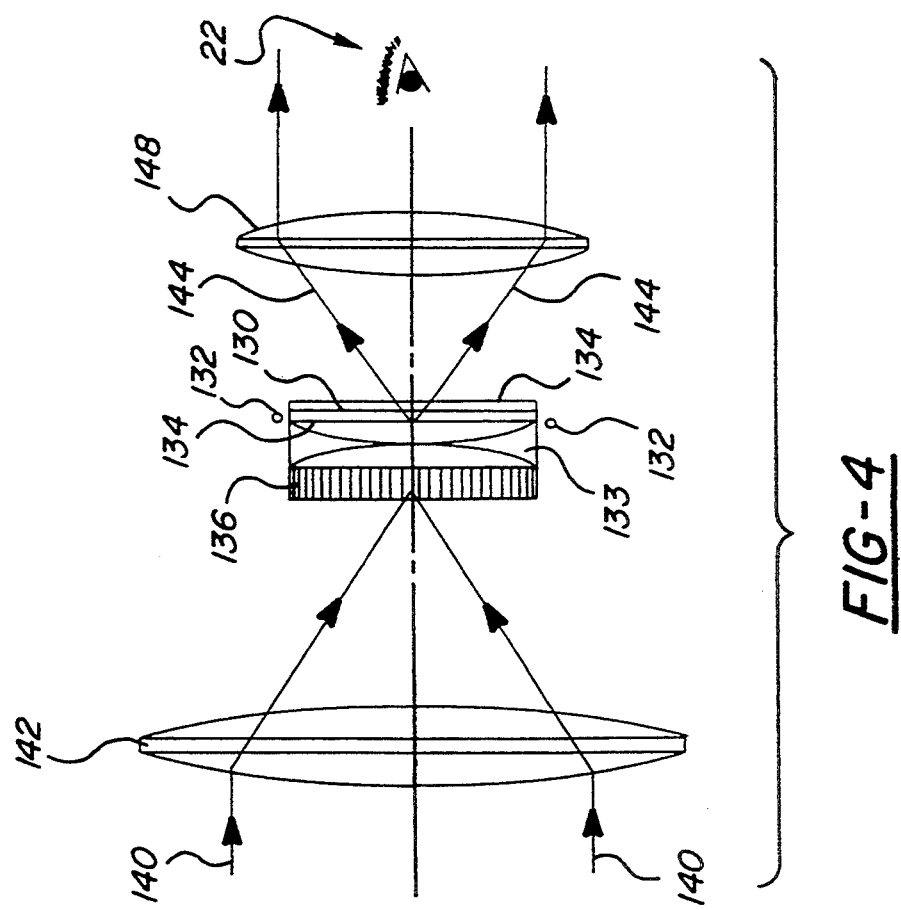
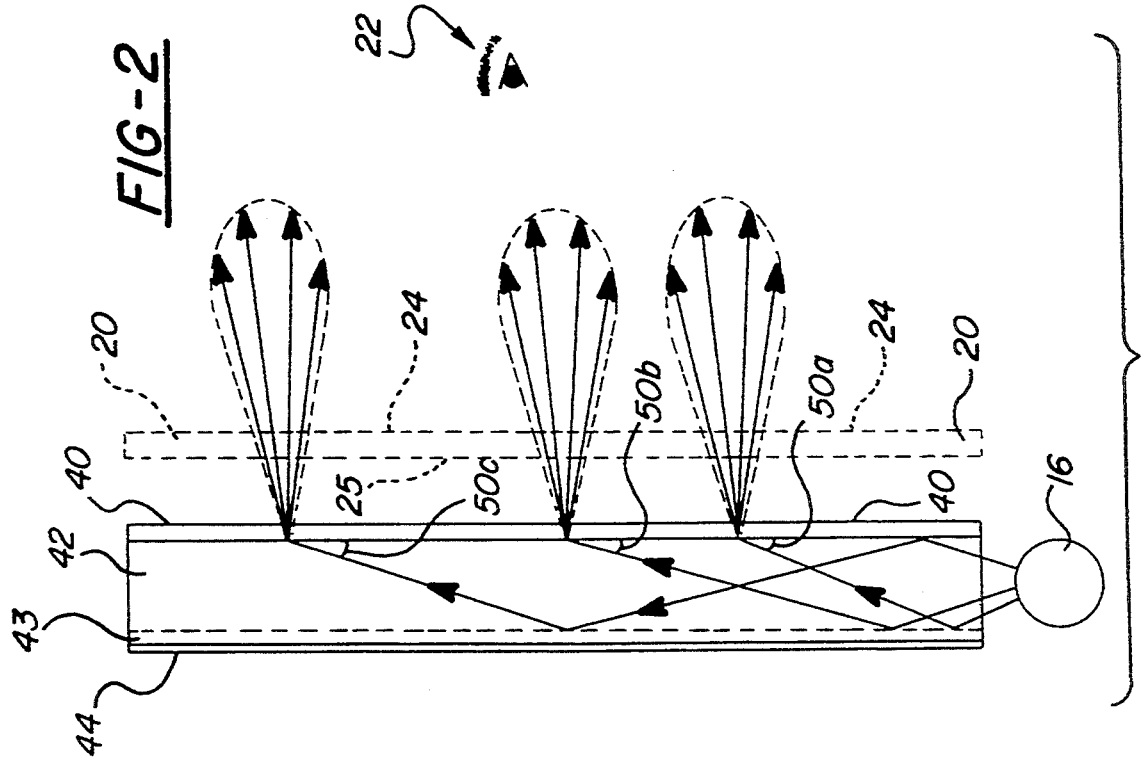

EDGE-LIT HOLOGRAPHIC DIFFUSERS FOR FLAT-PANEL DISPLAYS

FIELD OF THE INVENTION

The present invention relates generally to diffusers for back-lit displays, and, in particular, to a holographic diffuser that may be used in conjunction with an edge-illuminated substrate and other optical elements to provide more efficient and uniform illumination of display panels such as LCDs.

BACKGROUND OF THE INVENTION

Due to their low power consumption and small size, flat-panel displays have become increasingly popular for such applications as lap-top computers and pocket television receivers. See "Flat-Panel Displays," *Scientific American*, March 1993, p. 90. Transmissive displays such as liquid-crystal (LCD) displays have been especially well received due to their extremely low power consumption and potential for high resolution, including full-color applications. Whether of the twisted nematic or active-matrix variety, however, such LCD displays require backlighting, as they are non-emissive.

Regardless of whether the display is back-lit directly or indirectly, some form of light diffuser is generally required. Direct illumination sources include an array of tubular lamps or a single serpentine-type of lamp. Indirect sources often take the form of an edge-lit substrate composed of a material having light-piping characteristics, with light introduced along an edge being emitted across the surface after undergoing reflections internal to the light pipe. The diffuser is then usually supported against this light-emitting surface.

Conventional diffusers are ordinarily formed by a process which produces a roughened surface or which results in embedded scattering sites. Commonly used materials include flashed opal, sand-blasted glass and various flexible films exhibiting light-diffusing properties.

In general, conventional diffusers suffer from low efficiency. This is largely due to the fact that the axis associated with the diffused light is usually substantially the same as the ray of incident light, which has a low probability of already being normal to the surface of the diffuser—that is, in the direction of the display panel. Furthermore, even if the incident light and the scattered light are in the general direction of the display panel, conventional diffusers are prone to backscatter which further limits their overall efficiency.

Generally speaking, efforts to improve the uniformity of a conventional diffuser further degrade their efficiency. For example, by stacking conventional diffusers or using multiple diffusers which scatter through a variety of angles, uniformity will be improved, but backscatter and transmission loss will be experienced at each diffusing stage. Multiple panels also tend to increase manufacturing costs, or the depth of the backlighting structure, or both.

It has been proposed to use holographic-type diffusers in conjunction with flat-panel displays such as LCDs, but for the purpose of providing a uniform readout when viewed at an angle oblique to the display surface. As such, these diffusers are placed between the display and the observer, and not between the source of illumination and the back of the display panel. In U.S. Pat. No. 5,037,166, for example, a holographic optical system is used to redirect a display image only to an area at which the viewer may observe the image so as to prevent unwanted reflections and glare as when the instrument panel is within an aircraft cockpit. In U.S. Pat. No. 5,046,793, a holographic diffuser is used to provide chromatic correction, or color balance, in addition to redirecting display information to one or more viewing locations oblique to the display surface.

As such, an unfulfilled need remains for a diffuser, including a holographically prepared diffuser, for use with flat-panel displays such as LCDs. The proposed device should improve the efficiency and uniformity of illumination while allowing the backlight assembly to remain sufficiently thin for lap-top computer and other portable applications.

SUMMARY OF THE INVENTION

The present invention is accordingly directed toward a holographic diffuser that may be used by itself or in combination with other optical elements, including an edge-lit backlight assembly, to more efficiently and uniformly illuminate a transmissive-type flat-panel display such as an LCD. The planar diffuser is supported against a surface of a light-conductive substrate so as to receive rays of light having undergone reflections internal to the substrate. At the points where a ray of light strikes the diffuser, a holographic recording within the diffuser is operative to scatter the ray into a lobe-shaped pattern of radiant energy clustered about an axis, directed toward the back of the display panel, the angle formed between the axis and the plane of the diffuser being substantially constant over a range of incidence angles. In the preferred embodiment, the angle formed by the axis of the scatter lobe and the plane of the diffuser is substantially perpendicular across the surface of the diffuser. The ability of the holographic diffuser to redirect the light in this manner derives from the technique used to record the hologram.

The holographic diffuser may be recorded as transmissive or reflective, the former being positioned between the source of backlighting and the display panel, the latter being positioned on the side of the illumination source away from the display panel. Various configurations are possible, including the simultaneous use of both a transmissive and reflective diffuser.

In the case of a transmissive application, a specular-type of reflector may be used in conjunction with a cholesteric liquid-crystal (CLC) polarizer positioned between the diffuser and the display panel, the polarizer being operative to substantially pass circularly polarized light of a first handedness and substantially reflect circularly polarized light of the opposite handedness back to the specular reflector where it is efficiently converted to polarized light of the first handedness and, thus, subsequently passed by the CLC polarizer. Light from the CLC polarizer may further be passed through a quarter-wave plate positioned between the polarizer and the display panel, the plate being operative to convert the circularly polarized diffuse light from the CLC polarizer into linearly polarized light. An advantage of this configuration is that substantially all of the light emanating from the edge-lit substrate is delivered to the LCD as properly oriented linearly polarized light, without the losses ordinarily incurred with conventional light polarizers and diffusers. Furthermore, as the light is properly polarized for an LCD, the CLC polarizer/quarterwave plate combination may utilize a simplified display no longer requiring its ordinarily provided rear polarizing member.

In a further embodiment of the present invention, a second display source is used to project information onto the back surface of a light-conductive panel utilizing a transmissive-type of holographic diffuser, so that an observer may be able to see the display panel information superimposed with information from the second source. In a specific application, the information from the second source may be an image intensified by a night-vision system. A preferred method of holographically recording the diffusing layer is also presented.

BRIEF DESCRIPTION OF THE DRAWINGS

FIG. 1 is a cross-sectional drying of a conventional prior-art light diffuser;

FIG. 2 is a cross-sectional drawing of a backlight assembly formed in accordance with the present invention which incorporates an edge-lit source of backlighting and a transmissive-type of holographic diffuser;

FIG. 3 is a cross-sectional drawing used to show how a transmissive type of holographic diffuser may be used in conjunction with a cholesteric liquid-crystal (CLC) polarizer and quarter-wave plate to provide an LCD with properly oriented linearly polarized light;

FIG. 4 is a cross-section drawing of an optical system utilizing a backlight assembly formed in accordance with the present invention in conjunction with a second display source.

DETAILED DESCRIPTION OF THE PREFERRED EMBODIMENT

Figure 5:
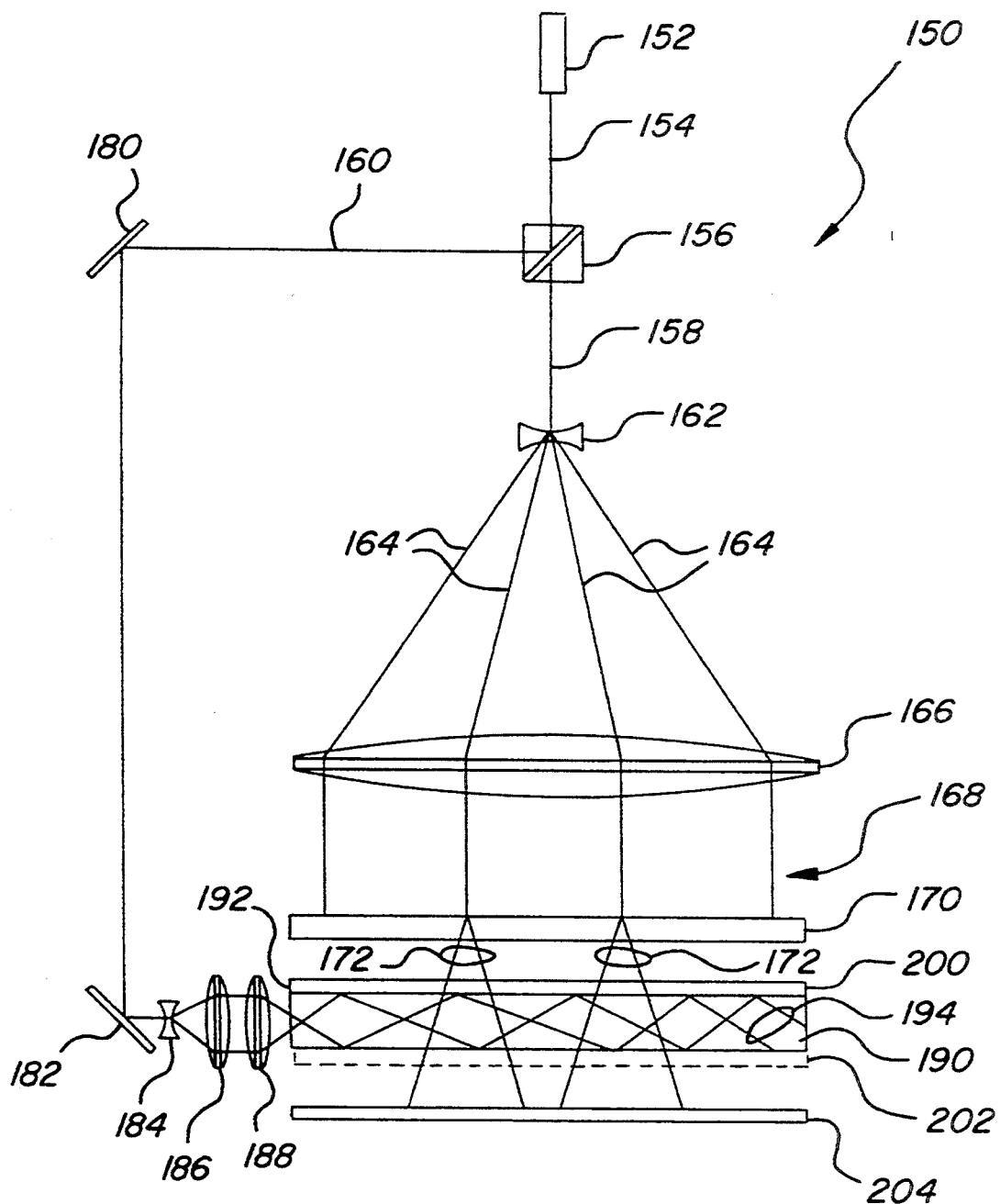
FIG. 5 is a schematic representation of an apparatus that may used to form transmissive or reflective-type of holographic diffusers for edge-lit applications.

Turning now to the figures, in FIG. 1 there is depicted a conventional prior art diffuser at 12 used in conjunction with a light-conductive substrate 14 incorporating a reflective or diffusive back surface 13, illuminated along an edge 15 by a source of illumination such as lamp 16. In this illustration, a transmissive type of display such as a liquid crystal display or LCD is positioned at 20 to enable an observer at 22 to view the surface of the display at 24.

Regardless of the configuration of the illumination source, rays of light 26, 28 and 30 impinge upon diffuser 12 at a variety of angles shown at 26a, 28a and 30a which are scattered by diffuser 12 into scatter lobes 26b, 28b and 30b, respectively. Each scatter lobe may be thought of as having a central axis around which the scattered energy is clustered, such as depicted by line 32 associated with scatter lobe 26b.

In the conventional diffuser the ray of light impinging upon the diffuser and the axis of the scatter lobe are essentially the same; that is, line 26 and line 32 are substantially coaxial. This situation is not as efficient as it could be, since, in the ideal case, all of the light scattered by the diffuser would be directed toward the back surface 25 of display panel 20 to ensure that an observer situated at point 22 can view surface 24 at optimum brightness and overall uniformity.

FIG. 2 illustrates a configuration similar to that in FIG. 1, except that a holographic diffuser 40, formed in accordance with the present invention, is used instead of a conventional diffuser in conjunction with a light-conductive panel 42. A reflecting layer may be added at 44, and a second diffuser, either conventional or holographic diffuser 43, recorded for reflective purposes, may be further incorporated as position 43. Surface 24 of display 20 is again observed by a viewer positioned in the vicinity of 22.

The use of a holographically recorded diffuser offers several distinct advantages over the conventional diffuser. In addition to minimum back scatter and higher efficiency, the angular extent of the forward scattering lobe emerging from a holographic diffuser may be matched to the application in such a way that the axis of the scattering lobe will remain substantially constant and largely independent of incidence angles 50a, 50b and 50c.

This effect is due to the fact that the forward scattering is established a priori during the holographic recording process. Upon reconstruction of the hologram, the diffuser behaves in a manner consistent with the recording, and scatters the light preferentially toward the back surface 25 of display 20. This is in marked contrast to the production of a conventional diffuser, the scattering pattern of which is not as rigorously matched to the geometry of the substrate in relation to illumination source. As such, with a conventional diffuser, the brightness of the display may grow weaker with increased distance from the illumination source. This problem may be countered by grading the efficiency of the diffuser as a function of distance from the lighting source, but note, however, that uniform scattering from a holographically recorded diffuser may be automatically established during recording without the need to further adjust efficiency across the surface upon reconstruction.

FIG. 3 is a cross-sectional drawing used to show how a transmissive-type of holographic diffuser 40 may be used in conjunction with a cholesteric liquid-crystal (CLC) polarizer 102 and quarter-wave plate 122 to provide an LCD display panel assembly 20 with properly oriented linearly polarized light. A reflecting element 44 is required, the addition of a second diffuser 43, either conventional or holographic, being optional. Surface 24 of LCD assembly 20 is again observed by a viewer positioned in the vicinity of 22.

A cholesteric liquid-crystal (CLC) polarizer 102 is placed in front of the light-conductive substrate with diffuser(s), and a quarter-wave plate 122 is further advantageously positioned between the CLC panel and the display panel. The CLC polarizer is operative to substantially pass circularly polarized light of a first handedness (as illustrated by scatter lobe 106) and substantially reflect circularly polarized light of the opposite handedness back to the diffuser (depicted at 110), through the light-conductive panel, and to the reflector, where it is converted to polarized light of the first handedness, and subsequently passed by the polarizer 102. Using one of the rays 112 reflected by the CLC panel as an example, it is returned through diffuser 40 and light-conductive substrate 42 to specular reflector 44, where it is reflected at point 114 to produce ray 116 which is now circularly polarized oppositely to that of ray 112. As a consequence, when diffracted by diffuser 40, the scattered radiation may now be passed by polarizer 102 as indicated by lobe 120.

Quarter-wave plate 122, being placed between polarizer 102 and display 20, is operative to convert the circularly polarized diffuse light, now of a single handedness, to linearly polarized light so as to be in substantial conformance with polarizer 124 which is generally provided on the back surface 25 of LCD display material 126. A front polarizer 128 is likewise ordinarily provided with conventional LCD displays. With the embodiment indicated in FIG. 3, with the addition of CLC polarizer 102 and quarter-wave plate 122, it may be possible to use an LCD assembly 20 without requiring its rear polarizer 124, as plate 122, used in conjunction with polarizer 102 together provide properly polarized light for direct use with liquid crystal material 126.

FIG. 4 is a schematic cross section used to illustrate how an edge-lit backlight assembly incorporating a holographic diffuser may be used with a second display source, in this case an intensified night-vision image, so that the image from the second display source and the image from the primary LCD display may be superimposed to the viewer. Referring to the figure, a thin, transparent, edge-illuminated holographic backlight 130 incorporating either a transmissive or reflective holographic diffuser, or both, (not shown), and illuminated by one or more edge-coupled sources 132, is placed in close proximity to display 134. On the back side of the backlight assembly 130 there is placed a second image source, in this case an image intensifier 136 fed through a fiber-twist at 133.

In the example shown, a secondary image, depicted by lines 140, may be focussed by an objective lens 142, which may contain one or more elements, intensified by intensifier 136. After focussing, diverging rays 144 are collimated by eye piece 148, which may also be comprised of multiple elements.

With the configuration shown in FIG. 4, the backlight illuminates the LCD display, but the backlight and LCD remain a clear window to the source of a secondary image, in this case a night vision system. When the image intensifier 136 and illumination sources 132 are switched at a sufficiently high interlace rate, the visual effect is that of a night vision goggle with overlaid symbology provided by the LCD display which may all be packaged similarly in size to a stand-alone night-vision type of goggle. To ensure a sufficiently high interlace rate, the illumination sources 132 in this case would preferably be implemented with light-emitting diodes (LEDs) or laser diode sources. Such an application calls for an extremely thin backlight, the maximum thickness of the overall assembly being determined by the allowable parallax between the night vision imagery and the LCD symbology. A minor amount of haze or diffusion in transmission through the backlight assembly may be tolerable, however, due to the close proximity of the backlight to the fiber-twist and image-intensifier components of the night-vision system. Wave guiding within the light-conductive material is preferably accomplished through the use of a low-refractive index (approximately 1.4) silicone-based optical cement to provide the bonding of the backlight to the rest of the assembly.

FIG. 5 illustrates an apparatus that may be used to facilitate a method used to produce both reflective and transmissive holographic diffusers according to the present invention. The apparatus is shown generally at 150. A laser 152 is used to provide a beam of substantially coherent radiation 154 which enters a beam splitter 156 which causes the laser beam to be split into an object beam 158 and a reference beam 160. The object beam 158 enters one or more optical elements 162 which cause the beam to diverge, as shown by rays 164.

An optional optical collimator 166, which may comprise more than the single element shown, may be used to convert highly divergent rays 164 present in a compact exposure system back into substantially parallel rays, as shown generally at 168. Alternatively, the diverging element(s) 162 may be placed a substantial distance from the diffuser 110, so that the divergence of rays 164 is minor enough not to require collimation. A diffuser 170 having a discrete angular scattering pattern, is positioned to receive light 168 and to diffuse that light as shown by scatter cones 172. Reference beam 160, having emerged from beam splitter 156, is redirected by one or more mirrors 180 and 182 to a diverging element 184, followed by a collimator 186, and one or more focussing elements 188. From focussing element 188, the reference beam is introduced into light conductive panel 190 through edge 192 where it undergoes multiple internal reflections depicted by lines 194.

A film of holographic recording material, such as a dichromated gelatin or photopolymer is used to coat substrate 190 either at layer 200, which would be used to produce a reflective-type of holographic diffuser, or at position 202, which would be used to produce a transmissive-type of holographic diffuser. An optical absorber 204 may be used to collect extraneous radiation. Regardless of whether the holographic recording film is placed at position 200 or 202, the reference beam undergoing multiple internal reflections shown at 194, impinges upon the recording film at multiple points across its surface and the interference pattern between the internally reflected reference beam and the diffused object beam is directed along substantially parallel lines at 168. When light-conductive substrate 190 with its holographic medium is edge illuminated after the recording, the scatter lobes emanating from the diffuser have an axis which is substantially perpendicular to the surface of the diffuser upon reconstruction.

Having thus described our invention, we claim:

1. A holographically recorded light diffuser to be used in conjunction with a source of light and a display panel having a back surface to receive light emanating from the diffuser, the diffuser comprising:

a planar, rigid, light-conductive substrate having a back surface and a forward surface in facing opposition to the back surface of said display panel; and a holographic optical element supported adjacent one of said substrate surfaces, whereby said substrate receives light from said source and illuminates said holographic optical element, said element functioning to redirect light incident thereupon toward the back surface of said display panel in the form of scatter lobes of light emerging across said substrate forward surface, each of said scatter lobes having a primary optical axis, each axis being parallel and the angle formed by each axis and the plane of said diffuser being constant over a wide range of angles of incidence.

2. The backlight assembly of claim 1 wherein the angle of the scatter lobe is substantially normal to the plane of the diffuser.

3. The backlight assembly of claim 1 wherein the diffuser is transmissive and supported against said front surface of the light-conductive substrate.

4. The backlight assembly of claim 1 wherein the diffuser is reflective and supported against said back surface of the light-conductive substrate.

5. A backlight assembly to be used with a flat-panel display having a back surface to receive backlighting, the assembly comprising:

a light-conductive substrate having a front surface, a back surface, and an edge;

a source of illumination disposed along at least a portion of the edge of the substrate so that light from the source may be introduced into the substrate and emitted as backlighting from its front surface; and a holographically recorded diffuser supported against a surface of the substrate to receive a light ray having undergone reflections internal to the substrate and redirect it toward the back surface of the display panel in the form of a scatter lobe clustered about an axis, the angle formed by the axis and the plane of the diffuser being substantially constant and independent of the angle of light incident upon said holographically recorded diffuser.

6. The backlight assembly of claim 5 wherein the axis of the scatter lobe is substantially perpendicular to the plane of the diffuser.

7. The backlight assembly of claim 5 further including a reflector disposed against the back surface of the light-conductive panel and a cholesteric liquid-crystal (CLC) polarizer disposed between the diffuser and the display panel, the polarizer being operative to substantially pass circularly polarized light of a first handedness and substantially reflect circularly polarized light of the opposite handedness back to the light-conductive panel where it may be converted to polarized light of the first handedness by the reflector and subsequently passed by the CLC polarizer.

8. The backlight assembly of claim 7, further including a quarter-wave plate placed between the polarizer and the display panel, the combination being operative to convert unpolarized diffuse light from the polarizer into linearly polarized light.

9. The backlight assembly of claim 7, further including a quarter-wave plate placed between the polarizer and the display panel, the plate being operative to convert circularly polarized diffuse light from the polarizer into linearly polarized light.

10. The backlight assembly of claim 5 further including a second display source used to superimpose information onto the back surface of the light-conductive panel so that an observer is able to see both the display panel information and the information from the second source.

11. The backlight assembly of claim 10 wherein the second source is an image intensified by a night-vision system.

12. The backlight assembly of claim 5, wherein said holographically recorded diffuser is formed by supporting a holographic recording media on the surface of a light-conductive substrate, illuminating an edge of the substrate with a reference beam of light and the exposed surface of the holographic recording medium with an object beam of light derived by passing light through a diffuser.

13. A liquid-crystal display (LCD) panel backlight assembly, comprising:

a light-conductive substrate having a front surface, a back surface, and an edge;

a source of illumination disposed along at least a portion of the edge of the substrate so that light from the source may be introduced into the substrate and emitted as backlighting from its front surface; and a holographically recorded diffuser supported against a surface of the substrate to receive light from the source and scatter it toward the back surface of the LCD display panel, the angle associated with the emerging light and the front surface of the diffuser being substantially constant and independent of the angle of light incident upon the holographically recorded diffuser.

14. The backlight assembly of claim 13 wherein the emerging light is substantially perpendicular to the front surface of the diffuser.

15. The backlight assembly of claim 13, wherein the holographically recorded diffuser is supported against the front surface of the substrate, the assembly further including a reflector disposed against the back surface of the substrate and a cholesteric liquid-crystal (CLC) polarizer supported between the diffuser and the back surface of the LCD display panel, the CLC polarizer being operative to substantially pass circularly polarized light of a first handedness and substantially reflect circularly polarized light of the opposite handedness back to the light-conductive panel where it may be converted to polarized light of the first handedness by the reflector for subsequent transmission by the CLC polarizer.

16. The backlight assembly of claim 15, further including a quarter-wave plate placed between the CLC polarizer and the back surface of the LCD display panel, the quarter-wave plate being operative to convert circularly polarized light from the polarizer into linearly polarized light.

* * * * *

UNITED STATES PATENT AND TRADEMARK OFFICE
CERTIFICATE OF CORRECTION

PATENT NO. : 5,418,631
DATED      : May 23, 1995
INVENTOR(S): Tedesco

It is certified that error appears in the above-indentified patent and that said Letters Patent is hereby corrected as shown below:

Column 3, line 15: Replace "drying" with --drawing--.

Signed and Sealed this

Seventeenth Day of October, 1995

Attest:

BRUCE LEHMAN

*Attesting Officer*  *Commissioner of Patents and Trademarks*